United States Patent
Tran et al.

(10) Patent No.: US 12,499,202 B2
(45) Date of Patent: Dec. 16, 2025

(54) APPARATUS FOR AUTHENTICATION LEVERAGING ACOUSTIC PROFILE PARAMETERS SCORED BY GENERATIVE ARTIFICIAL INTELLIGENCE ("AI")

(71) Applicant: Bank of America Corporation, Charlotte, NC (US)

(72) Inventors: Ngoc Tran, Charlotte, NC (US); Abhijit Behera, Hyderabad (IN); Maneesh Sethia, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 139 days.

(21) Appl. No.: 18/633,710

(22) Filed: Apr. 12, 2024

(65) Prior Publication Data

US 2025/0322056 A1 Oct. 16, 2025

(51) Int. Cl.
*G06F 21/40* (2013.01)
*G06F 21/32* (2013.01)

(52) U.S. Cl.
CPC .............. *G06F 21/40* (2013.01); *G06F 21/32* (2013.01)

(58) Field of Classification Search
CPC ................................ G06F 21/40; G06F 21/32
See application file for complete search history.

(56) References Cited

U.S. PATENT DOCUMENTS

| | | | |
|---|---|---|---|
| 6,509,847 B1 * | 1/2003 | Anderson | G06F 3/04883 178/18.01 |
| 10,635,800 B2 * | 4/2020 | Bakish | H04L 9/3271 |
| 2004/0064709 A1 * | 4/2004 | Heath | G07C 9/37 713/186 |
| 2017/0140138 A1 * | 5/2017 | Samuel | G06F 21/84 |
| 2025/0324257 A1 * | 10/2025 | Coyle | H04W 12/30 |

* cited by examiner

*Primary Examiner* — Harunur Rashid
(74) *Attorney, Agent, or Firm* — Weiss & Arons LLP

(57) ABSTRACT

An acoustic fingerprinting system includes an initial request from an authentic user. The input comprises a password with a plurality of keys. A smart sensor measures sounds associated with the keys. The smart sensor converts the sounds into notes that correspond to the keys. The notes may be stored in a database. There may be a second request from a user to access the system. The second request may include a second input of the password. The second input may include a sound associated with the keys of the password. The sounds may be converted to second notes. The second notes may be compared to the notes stored in the database. The user may be assigned a score based on the comparison. In the event that the score is greater than a predetermined number, the user may be granted access to the system.

18 Claims, 4 Drawing Sheets

APPARATUS FOR AUTHENTICATION LEVERAGING ACOUSTIC PROFILE PARAMETERS SCORED BY GENERATIVE ARTIFICIAL INTELLIGENCE ("AI")

FIELD OF TECHNOLOGY

Aspects of the disclosure relate to artificial intelligence ("AI"), authentication and authorization.

BACKGROUND OF THE DISCLOSURE

Systems provide passwords to prevent people of malicious intent from retrieving data and confidential information. Passwords include a plurality of characters, numbers and punctuations in a specific, predetermined order.

Passwords are input using keys of a keyboard, keypad and/or pin pad. As the user inputs a password, the user may create keystrokes on the keys. Every key on a keyboard produces a unique sound. The sounds of the keys can be retrieved. People of malicious intent can identify keyboard sounds to maliciously retrieve passwords. The maliciously retrieved passwords can be used to access data and confidential information. The following systems use passwords and may therefore be vulnerable to unauthorized access: an autonomous teller machine ("ATM"), an online banking portal over the Internet, online shopping and/or other systems.

Sounds can be retrieved through an acoustic side channel hacking technique. A person of malicious intent may be associated with the acoustic side channel hacking technique. The acoustic side channel hacking technique enables a person of malicious intent to record the sounds of the keys as a user inputs the password. The acoustic side channel hacking technique can be implemented using a deep learning AI model. The acoustic side channel hacking models are trained with training data. The training data includes a plurality of inputs of the keys on a keyboard and/or a keypad from a plurality of users. The acoustic side channel hacking models are trained to detect the unique sound of each of the keys.

People of malicious intent utilize acoustic side channel hacking models to retrieve passwords and to access data and/or confidential information. Such scenarios may include accessing a bank account, accessing other systems and/or accessing other data.

Therefore, it would be desirable to provide methods, apparatus and systems that would heighten security associated with passwords.

It would be further desirable to provide methods, apparatus and systems to prevent access to data in the event that a password protecting the data has been compromised.

It would be yet further desirable for the methods, apparatus and systems to counteract the acoustic side channel hacking technique.

SUMMARY OF THE DISCLOSURE

Apparatus, systems and methods for authentication leveraging acoustic profile parameters scored by generative AI are provided.

Methods may counteract acoustic side channel hacking by customizing the way a computer receives input from a user. Instead of using the entered keys to verify the user, keystroke parameters (such as pressure, length, etc.) may be captured in addition to the entered keys. Both the captured keys and keystrokes may be used to verify the user.

Methods may include receiving, at a system, an initial input of a password. The system may be a computing system. The computing system may include a memory, a processor and/or any other suitable computing components. The initial input of the password may be from an initial user. The password may include an input of multiple keys. The user may create keystrokes on the keys as the user types the password. As the user types the password, the user may place different amounts of pressure on different keys. The user may create unique sounds as the user types the password. Each key on the keyboard may create a unique sound, specific to the key.

Methods may further include measuring the sound and the pressure of each key on the keyboard. A smart sensor may measure the sound and the pressure of each key on the keyboard. The smart sensor may aggregate the sound associated with the plurality of keystrokes. The smart sensor may measure the aggregated sound and the pressure of each key on the keyboard. The smart sensor may be a device that retrieves input from the physical environment. The smart sensor may use built-in computer resources to perform predefined functions upon detection of the input. The smart sensor may process data and input. The smart sensor may be situated on, or around, the keyboard. The smart sensor may measure the pressure and sound of the user's keystrokes on the keyboard.

The smart sensor may process the data. The smart sensor may convert each of the measured sounds into discreet notes. Each discreet note may correspond to a key on the keyboard. Each keystroke along with an accompanied pressure, velocity, sensed fingerprint and sound may be represented by a discreet note. Each of the discreet notes may be specific for a key on the keyboard.

In certain embodiments, an acoustic fingerprinting technique may include a user typing each letter located on the keyboard. An initial time the user logs into the system, the user may type each letter and/or each of the keys of the keyboard. The system may use the typed letters as a security in addition to the typed password.

Methods may further include storing the discreet notes within a database. The notes may be stored within a database and associated with a specific key. One example may be that key "Q" may be stored with note "27". The database may store the notes as associated with the user. There may be multiple users using the acoustic fingerprinting technique. Each user may be assigned a specific location within the database. The keys, discreet notes and password may be stored within the specific location associated with, or assigned to, the user.

Each of the plurality of keys may be associated with the discreet notes. Each of the plurality of keys may be stored within the database as associated with the discreet notes. There may be an indicator within the database indicating which note corresponds to which key.

Methods may include receiving a second input of the password. The second input may be in order to access a resource application. The second input may be identical to the first input of the password. The keystrokes may be the same. The keystrokes may be different. The second input may be from the initial user. The second input may be from a user that purports to be the initial user and is of malicious intent. The system may determine whether the user is the initial user, or whether the user is a user of malicious intent.

Methods may include measuring, using the smart sensor, a second sound and a second pressure associated with each key of the second input of the password. The second sound and second pressure may be different from the sound and pressure of the initial input of the password. The second sound and second pressure may be identical to the sound and pressure from the initial input of the password. The smart sensor may convert the second sound and second pressure of the keys to a second set of discreet notes.

Methods may include comparing the first set of discreet notes, stored in the database, to the second set of notes. For example, note "27" stored in the database and corresponding to key "Q" may be compared to key "Q" from the second set of discreet notes. The second note that corresponds to key "Q" may be note "43". Second note "43" may be dissimilar to first note "27".

Methods may include assigning, using the acoustic fingerprinting model, a similarity score to the second user, based on the second input. The second user may be the second user pursuant on the second user's use of the initial user's password. The similarity score may be based upon the comparison of both sets of notes. In the above example, the score may be a 0% score, as the notes "43" and "27" are dissimilar. In certain embodiments, the similarity score may be 100%. The comparison of each key may produce a similarity score.

Methods may further include aggregating the scores from each key into an aggregated score. Methods may include assigning a score to the second user based on the aggregated score. A score may include a predetermined percentage of similarity between 0% and 100%. In some embodiments, the second user may score greater than the predetermined percentage of similarity. In such embodiments, the password may be verified and the second user may login to the system. The predetermined percentage of the similarity score may be 75%, 80%, 85%, 90%, 95%, 100% and/or any other suitable percentage.

In certain embodiments, there may be a predetermined percentage of dissimilarity. The predetermined percentage of dissimilarity may be 0%, 5%, 10%, 15%, 20%, 25%, 30% or any other suitable percentage. The similarity score may show the similarity between the second user's keystrokes and the first user's keystrokes. A higher similarity score may represent a greater similarity between the first user's keystrokes and the second user's keystrokes.

In some embodiments, a user may score above a specific percentage, such as 80%. In such embodiments, the user may be confirmed and authenticated.

In some embodiments, a user may score minimally lower than a threshold of similarity. The threshold may be a specific percentage, such as 75%. In such embodiments, the system may request that the user answer a questionnaire. The questionnaire may determine if the user is the initial user or is a user of malicious intent. The system may determine the authenticity of the user by comparing and scoring the letters of the typed answer to the keystrokes the initial user input, at the initial log in. The compared keystrokes may be keys the initial user input as the initial user logged in the initial time.

In some embodiments, a user may score lower than a specific percentage, such as 40%. In such embodiments, the user may be locked out of the system.

A person of malicious intent may retrieve the keys included in the password. However, the user of malicious intent may not be able to input the password at the same velocity, using the same fingerprint, with the same pressure and create the same sounds as the initial user. As such, when the second user is of malicious intent, the second user may score significantly less (for example, less than 20%) than the predetermined percentage of similarity. The password may be denied for a user of malicious intent, and the second user may be denied access to the system.

At times, the second user may be the initial user. The initial user, however, may not input the password the second time with the same velocity and the same pressure as input the initial time. As such, the user may score less than the predetermined percentage of similarity between the two input passwords. Therefore, the initial user may retype the password in order to access the system. The user may retype the password. The input of the retyped password may be compared to the initial input of the password. The comparison between the retyped password and the initial input of the password may be greater than the predetermined percentage of similarity. Also, at times the initial user may receive a new password via email and/or other methods.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
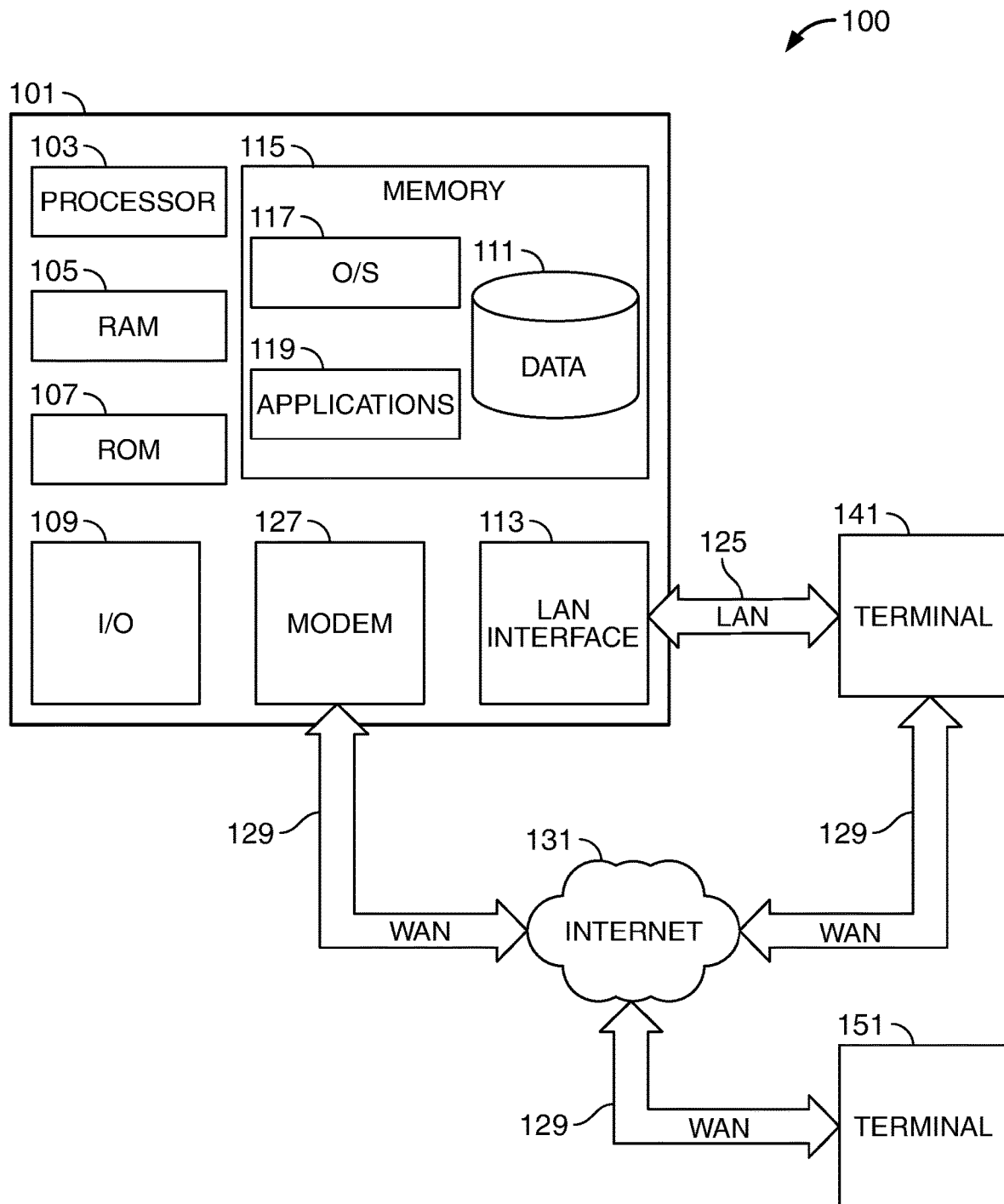
FIG. 1 shows an illustrative diagram in accordance with principles of the disclosure.

Apparatus, systems and methods for providing apparatus for authentication leveraging acoustic profile parameters scored by generative artificial intelligence ("AI") are provided.

Apparatus may include an acoustic fingerprinting device. The acoustic fingerprinting device may form part of a system. Systems may include ATM's, online banking portals over the internet, online shopping systems and/or other systems. Such systems may have stored user's credit card numbers, user's social security numbers, bank account number and/or other confidential information.

There may be an initial request from an initial user to access the system. The initial request may include a username and a password. The username and password may be input using keys on a keyboard and/or keypad. The username and password may be reused.

The initial user may place a certain amount of pressure on the keys as the initial user inputs the password. The user may type the password with a certain velocity. The user's fingerprint may be sensed as the user types the password. The user may create specific sounds when typing the password. There may be additional details that are associated with the input of the password. The details may be referred to as keystrokes.

Apparatus may include one or more smart sensors. Each smart sensor may include a sensor, a microprocessor and/or supporting wireless communication. Wireless communication may include Wi-Fi®, Bluetooth®, Internet and/or any other suitable wireless communication. Each smart sensor may be configured to monitor the keyboard and/or keypad. In some embodiments, each smart sensor may be directly coupled to the physical keypad, keyboard and/or mobile device. In some embodiments, the smart sensor may be found within a proximity of twenty feet of the keypad, keyboard and/or mobile device.

The smart sensor may retrieve the pressure, the sound, the velocity, the fingerprint and other details associated with the input password. The smart sensor may convert the pressure, the sound, the velocity and the fingerprint into corresponding discreet notes. Each discreet note may correspond to a specific key on the keyboard. Every key may have a unique sound, a unique pressure and may be pressed down for a unique or specific amount of time, which may be represented by the discreet note.

Apparatus may further include a database. The keys and corresponding discreet notes may be stored within the database. Each key may be stored along with the corresponding discreet note. There may be a plurality of keys stored within the database.

The system may receive a second request using the same username to access the system. The second request may be from the initial user. The second request may be a request from a user of malicious intent who purports to be the initial user. The user of malicious intent may have retrieved the password through an acoustic side channel hacking technique.

An acoustic side channel hacking technique is a technique that can retrieve keys that have been typed through the sound that is emitted through the typing. This may occur, for example, at an ATM. A user may have inserted a card into the ATM. The ATM may have asked the user to input a password to verify the transaction. Nearby, there may be a mobile device belonging to a person of malicious intent. The person of malicious intent may be associated with the acoustic side channel hacking technique. The person of malicious intent may have enabled the acoustic side channel hacking technique on the mobile device.

A person of malicious intent may record, using the acoustic side channel technique, the sounds emitted from typing a password of the user. In an event where the user mistakenly leaves behind the transaction card, the person of malicious intent may perform one or more transactions using the transaction card. As such, systems associated with the ATM may perform the transactions on condition that the person of malicious intent inputs the correct password. Systems may prevent misuse of passwords through an acoustic fingerprinting system. The acoustic fingerprinting system may provide the system and/or user with a multi-layer security.

The user may input the password, as the user inputs the second request to access the system. The user may place a certain amount of pressure on the keys as the user inputs the password a second time. The user may type the password with a certain velocity. The user may create certain sounds when typing the password. The fingerprints may be sensed as the user types the password. The user may create sounds as the user types specific keys. The system may determine if the user is an authentic user based on the velocity, the sound, the sensed fingerprint and/or the pressure.

The smart sensor may convert the pressure, the velocity, the sensed fingerprint and the sound into a second set of discreet notes. Each of the second set of discreet notes may correspond to a key. The acoustic fingerprinting system may compare the first set of corresponding discreet notes, which have been stored in the database, to the second set of discreet notes created from the second input.

The acoustic fingerprinting system may assign a score to the second user based on the comparison. The score may be based upon a comparison between the first set of discreet notes and the second set of discreet notes. The notes may be compared using the key associated with each note. The key in both sets of notes may be the same and the pressure, the velocity, the sensed fingerprint and the sound may be the same. The key in both sets of notes may be the same, however, the pressure, the velocity, the sensed fingerprint and the sound may be different. The score may be based on the similarity of the pressure, the velocity, the sensed fingerprint and the sound of each of the keystrokes in the first set of notes to the keystrokes associated with the second user.

The score may be a 100% score or any other suitable percentage. In order to be valid, the score may have to be greater than a predetermined threshold. The predetermined threshold may be 80%, 85%, 90%, 95% or any other suitable percentage. In an embodiment where the user scores greater than the predetermined threshold, the user may be determined as the authentic user. In such an embodiment, the user may be granted access to the system.

In other embodiments, the second user may score less than the predetermined threshold. In such embodiments, access to the system may be denied to the user. The user may be identified as a user of malicious intent. The user may be identified as a user of malicious intent because the user typed the password with different keystrokes than the keystrokes of the initial user. The velocity, the pressure, the sensed fingerprint and the sound of the user of malicious intent may be different, greater than a threshold of difference, than the velocity, the pressure, the sensed fingerprint and the sound of the authentic user.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of apparatus 100 that includes a computer 101. Computer 101 may alternatively be referred to herein as a "computing device." Elements of apparatus 100, including computer 101, may be used to implement various aspects of the apparatus and methods disclosed herein. A "user" of apparatus 100 or computer 101 may include other computer systems or servers or computing devices, such as the program described herein.

Computer 101 may have one or more processors/microprocessors 103 for controlling the operation of the device and its associated components, and may include RAM 105, ROM 107, input/output module 109, and a memory 115. The microprocessors 103 may also execute all software running on the computer 101—e.g., the operating system 117 and applications 119 such as an artificial intelligence implemented acoustic fingerprinting technique. Other components commonly used for computers, such as EEPROM or Flash memory or any other suitable components, may also be part of the computer 101.

The memory 115 may be comprised of any suitable permanent storage technology e.g., a hard drive or other non-transitory memory. The ROM 107 and RAM 105 may be included as all or part of memory 115. The memory 115 may store software including the operating system 117 and application(s) 119 (such as an artificial intelligence implemented acoustic fingerprinting technique) along with any other data 111 (e.g., stored pressure, stored velocity) needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

The network connections/communication link may include a local area network ("LAN") and a wide area network ("WAN" or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, Wi-Fi, cellular networks, or other suitable frequencies.

Any memory may be comprised of any suitable permanent storage technology—e.g., a hard drive or other non-transitory memory. The memory may store software including an operating system and any application(s) (such as an artificial intelligence implemented acoustic fingerprinting technique) along with any data needed for the operation of the apparatus and to allow bot monitoring and IoT device notification. The data may also be stored in cache memory, or any other suitable memory.

An input/output ("I/O") module 109 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 101, the microprocessor 103 may execute the instructions in all or some of the operating system 117, any applications 119 in the memory 115, any other code necessary to perform the functions in this disclosure, and any other code embodied in hardware or firmware (not shown).

In an embodiment, apparatus 100 may consist of multiple computers 101, along with other devices. A computer 101 may be a mobile computing device such as a smartphone or tablet.

Apparatus 100 may be connected to other systems, computers, servers, devices, and/or the Internet 131 via a local area network ("LAN") interface 113.

Apparatus 100 may operate in a networked environment supporting connections to one or more remote computers and servers, such as terminals 141 and 151, including, in general, the Internet and "cloud". References to the "cloud" in this disclosure generally refer to the Internet, which is a world-wide network. "Cloud-based applications" generally refer to applications located on a server remote from a user, wherein some or all of the application data, logic, and instructions are located on the internet and are not located on a user's local device. Cloud-based applications may be accessed via any type of internet connection (e.g., cellular or Wi-Fi).

Terminals 141 and 151 may be personal computers, smart mobile devices, smartphones, IoT devices, or servers that include many or all of the elements described above relative to apparatus 100. The network connections depicted in FIG. 1 include a local area network ("LAN") 125 and a wide area network ("WAN") 129 but may also include other networks. Computer 101 may include a network interface controller (not shown), which may include a modem 127 and LAN interface or adapter 113, as well as other components and adapters (not shown). When used in a LAN networking environment, computer 101 is connected to LAN 125 through a LAN interface or adapter 113. When used in a WAN networking environment, computer 101 may include a modem 127 or other means for establishing communications over WAN 129, such as Internet 131. The modem 127 and/or LAN interface 113 may connect to a network via an antenna (not shown). The antenna may be configured to operate over Bluetooth, Wi-Fi, cellular networks or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for an artificial intelligence implemented acoustic fingerprinting technique, as well as other programs. In an embodiment, one or more programs, or aspects of a program, may use one or more artificial intelligence/machine learning ("AI/ML") algorithm(s). The various tasks may be related to terminating or preventing a malicious AI from completing its malicious activities.

Computer 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, server, or any other suitable device for receiving, storing, transmitting and/or displaying relevant information. Terminal 151 and/or terminal 141 may be other devices such as remote computers or servers. The terminals 151 and/or 141 may be computers where a user is interacting with an application.

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations.

Examples of well-known computing systems, environments, and/or configurations that may be suitable for use with the invention in certain embodiments include, but are not limited to, personal computers, servers, hand-held or laptop devices, tablets, mobile phones, smart phones, other computers, and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, IoT devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
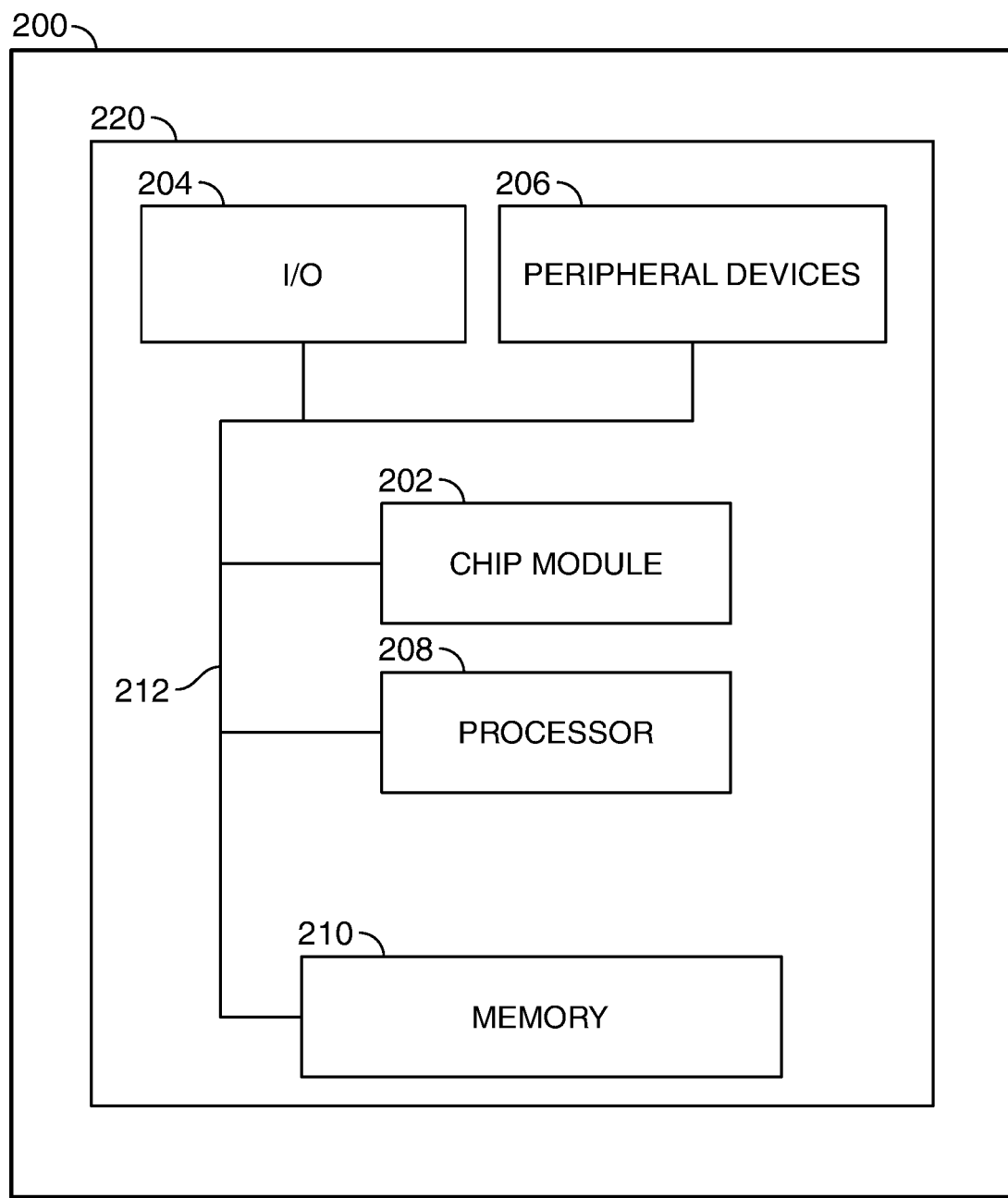
FIG. 2 shows another illustrative diagram in accordance with principles of the disclosure.

FIG. 2 shows illustrative apparatus 200 that may be configured in accordance with the principles of the disclosure. Apparatus 200 may be a server or computer with various peripheral devices 206. Apparatus 200 may include one or more features of the apparatus shown in FIGS. 1-4. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, a display (LCD, LED, OLED, etc.), a touchscreen or any other suitable media or devices, peripheral devices 206, which may include other computers, logical processing device 208, which may compute data information and structural parameters of various applications, and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
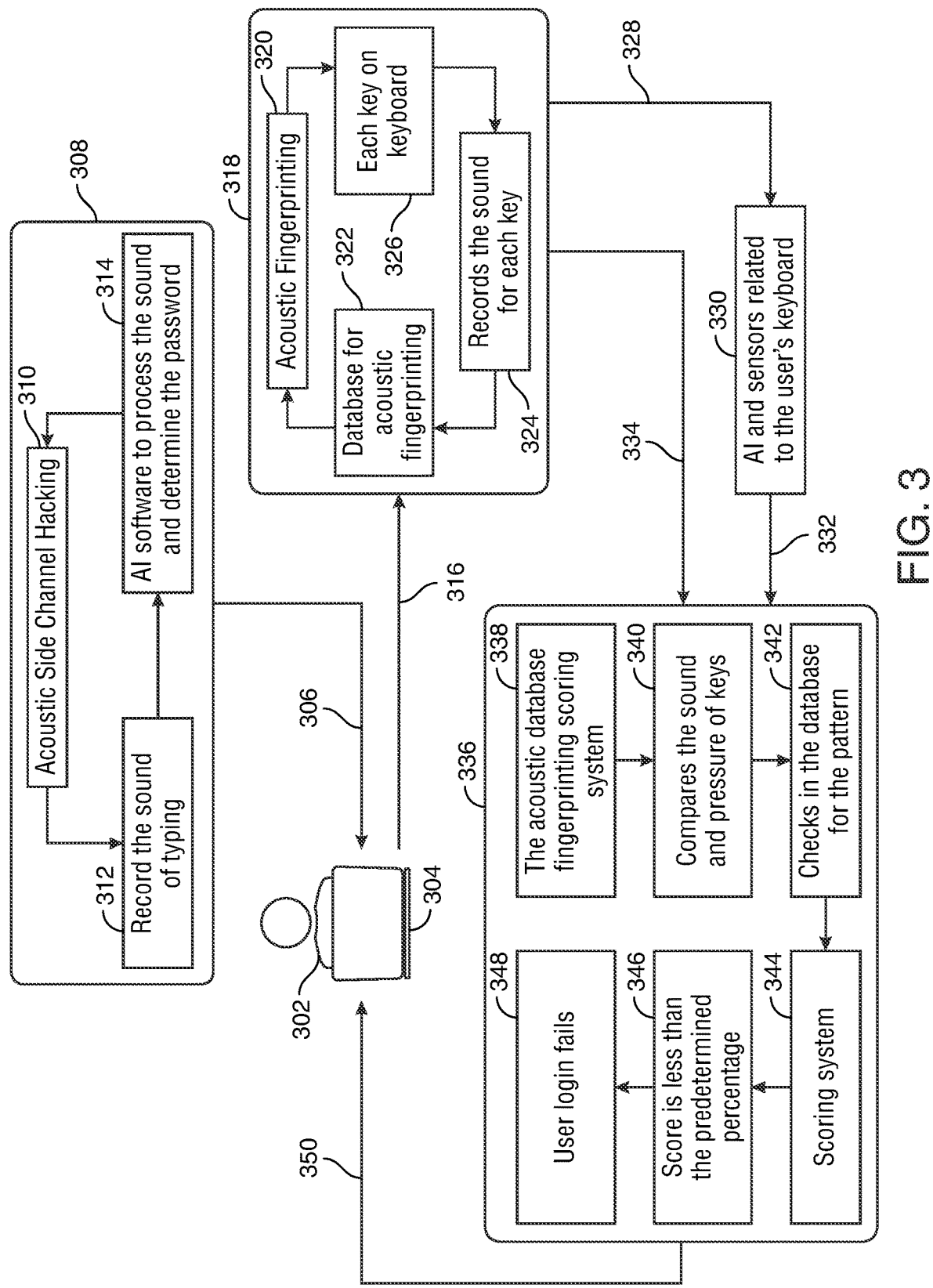
FIG. 3 shows an illustrative flow diagram in accordance with the principles of the disclosure.

FIG. 3 shows an illustrative flow diagram in accordance with the principles of the disclosure. User 302 may attempt to log into a system. User 302 may use mobile device 304 to log into the system. User 302 may log into the system one or more times.

An initial time user 302 logs into the system, user 302 may create and input a password. User 302 may use a keyboard located on mobile device 304 to input the password. There may be an acoustic side channel hacking technique associated with mobile device 304, as shown at step 306. User 302 may be unaware that there is an acoustic hacking technique associated with mobile device 304.

Systems may include ATMs, online banking, online shopping, mobile applications and as well as other systems. User 302 may log into an ATM in addition to mobile device 304. User 302 may insert a banking card into the ATM. User 302 may input an associated personal identification number ("PIN") on a pin pad found in the ATM. The pin pad may be comprised by an acoustic side channel hacking technique.

People of malicious intent may be associated with the acoustic side channel hacking technique. People of malicious intent may retrieve the password using the acoustic side channel hacking technique. The people of malicious intent may retrieve the card and may perform transactions using the card. The password and/or pin may not provide a security against the people of malicious intent as the people of malicious intent input the retrieved password.

The method for acoustic side channel hacking technique is shown at diagram 308. Diagram 308 includes acoustic side channel hacking technique 310. Acoustic side channel hacking technique 310 is a technique that enhances the sounds of keys on a keyboard, keypad, pin pad or any suitable device, using a microphone. The microphone may record the sounds a user may create by inputting a password. Acoustic side channel hacking technique 310 may enhance the sounds and may determine the keys based on the enhanced sounds, as shown at step 312.

A deep learning AI module may form part of the acoustic side channel hacking technique. The deep learning AI module may enhance the sounds to determine the keys of the password that was typed. The deep learning AI module may process the sound of the typing and decipher the keys, as shown at step 314.

Acoustic side channel hacking technique 310 may be implemented in a device located within a close proximity to a user and/or a user's mobile device. Acoustic side channel hacking technique 310 may be implemented on an app with a microphone located on the user's device. The acoustic side channel hacking technique may record the sounds of the keys in other ways as well.

Step 316 shows user 302 inputting a password into the system using mobile device 304. Step 316 is the initial time the user inputs the password.

Diagram 318 shows the process of an acoustic fingerprinting technique. The acoustic fingerprinting technique counteracts the acoustic side channel hacking technique to prevent users of malicious intent from comprising a system. The acoustic fingerprinting technique measures the user's velocity, the pressure, the sensed fingerprint and any other suitable details in addition to recording the sound. The acoustic fingerprinting technique verifies the sound, the velocity, the pressure, the sensed fingerprint and any other suitable details associated with inputting the password.

In the event that a user of malicious intent purports to be the initial user, access to the system may be denied to the user. The password input from the user of malicious intent may not match the velocity, the sound, the sensed fingerprint and the pressure of the initial user. In such an embodiment, the password may not be verified.

Diagram 318 shows the acoustic fingerprinting technique. User 302 may input a password. The system may use acoustic fingerprinting technique 320. Acoustic fingerprinting technique 320 may include a deep learning AI module. User 302 may type each key on the keyboard, as shown at step 326. Step 326 may be an additional step. User 302 may type each key found on the keyboard in addition to the keys user 302 typed for the password. Acoustic fingerprinting technique 320 may record and store the sound and pressure user 302 places on the keyboard as user 302 types the keys, as shown at step 324. The sound and pressure associated with each key may be stored in database for acoustic fingerprinting 322.

The acoustic fingerprinting technique may be used every time a user logs into a system using a username associated with user 302. Diagram 318 may be stored in the system, as shown at step 334.

Step 328 shows the user logging in to the system. There may be an AI system and/or one or more sensors connected to the user's keyboard, as shown at step 330. Step 332 shows the user and the one or more sensors inputting the data into the system.

Diagram 336 shows the system operating with the acoustic fingerprinting technique. The acoustic fingerprinting technique may prevent users of malicious intent from comprising the system. Step 338 may be a primary step the system takes when a user attempts to login a second (or subsequent) time. The system may access the acoustic fingerprinting scoring system, shown at diagram 318.

Step 340 may be a second step the system takes. Step 340 may compare the pressure of the initial user to the user attempting to the login to the system. A similarity score may be assigned to the user attempting to log into the system, as shown at step 344. A user that scores above a predetermined threshold may gain access into the system. The predetermined threshold, or limit may be referred to as the scoring limit.

The scoring limit may be different for each user. The scoring limit may be the same for each user. The scoring limit may be a predetermined percentage. The predetermined percentage may be 75%, 80%, 85%, 90%, 95%, 100% or any other suitable number.

In step 346, the user may score less than the predetermined percentage. In such an event, the user attempting to login may fail the password authentication step and the system may deny access to the user, as shown in step 348 and executed in step 350.

Figure 4:
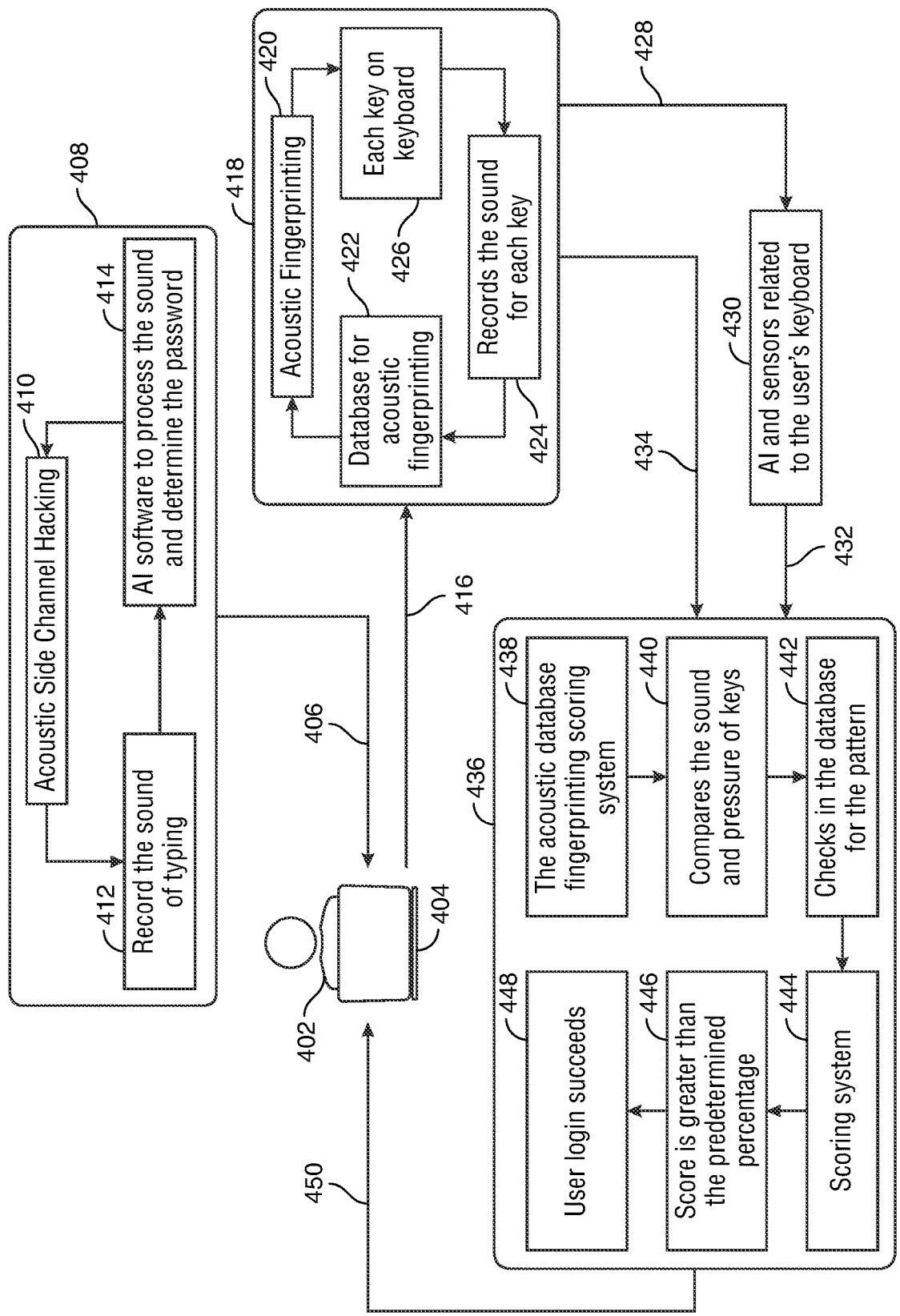
FIG. 4 shows another illustrative flow diagram in accordance with the principles of the disclosure.

FIG. 4 is another illustrative flow diagram. FIG. 4 directly relates to FIG. 3 and the portion of the specification described therein. In FIG. 4, the user may be an authentic user and the user may score greater than the predetermined percentage, as shown at step 446. The user may successfully log into the system, as shown at step 448 and executed in step 450.

Thus, apparatus for authentication leveraging acoustic profile parameters scored by generative AI is provided. Persons skilled in the art will appreciate that the present invention can be practiced by other than the described embodiments, which are presented for purposes of illustration rather than of limitation. The present invention is limited only by the claims that follow.

What is claimed is:

1. A method for acoustic fingerprinting, the method comprising:
    receiving, at a computer system, an initial input of a password from an initial user, said initial input comprising an initial plurality of keystrokes on a plurality of keys on a keyboard;
    measuring, using a smart sensor, a sound associated with each of the initial plurality of keystrokes;
    converting, using the smart sensor, each of the plurality of keystrokes into a plurality of corresponding notes, each of said notes comprising a discreet sound;
    storing each of the plurality of keys and corresponding discreet notes in a database;
    receiving, at the system, a second input of the password from a second user, said second input comprising a second plurality of keystrokes on the plurality of keys on the keyboard;
    measuring, using the smart sensor, a second sound associated with each of the second plurality of keystrokes;
    converting, using the smart sensor, each of the second plurality of keystrokes into a plurality of second corresponding notes;
    comparing, using an acoustic fingerprinting model, the second corresponding notes to the corresponding discreet notes stored in the database; and
    based on the comparing, using the acoustic fingerprinting model to assign a score to the second user;
        wherein, when said score is greater than a pre-determined percentage of similarity, granting the second user access into the system; and
        when said score is less than the pre-determined percentage of similarity, denying the second user access into the system
        wherein the acoustic fingerprinting device is further configured to:
            convert a second input and an associated sound, pressure and velocity, said second input of the password from a second user, to a second plurality of notes;
            compare the notes stored in the database to the second plurality of notes; and
            assign a similarity score to the second user based on the comparison;
            authenticate the second user when the similarity score is above the threshold level of similarity, and
            when said similarity score of the second user is below the threshold level of similarity, deny the second user access to the system.

2. The method of claim 1 wherein the said predetermined percentage of similarity is 85%.

3. The method of claim 1 wherein the second user is the initial user.

4. The method of claim 1 wherein the second user is a user of malicious intent purporting to be the initial user, said purporting being pursuant on the second user's use of the initial user's password.

5. The method of claim 1 wherein the acoustic fingerprinting forms part of the system.

6. The method of claim 1 wherein the smart sensor is further configured to measure a velocity and a pressure associated with the initial user's input of the password.

7. The method of claim 1 wherein the smart sensor is within a proximity of the keyboard.

8. The method of claim 7 wherein the proximity is within twenty feet of the keyboard.

9. The method of claim 1 wherein the smart sensor is further configured to sense a user's fingerprint as the user types the keystrokes.

10. An acoustic fingerprinting system, the acoustic fingerprinting system comprising:
    a receiver for receiving a request from an initial user, said request input into a computing system, the request comprising a password with a plurality of keystrokes;
    a smart sensor for measuring a sound associated with each of the plurality of keystrokes included in the password;
    an acoustic fingerprinting model, the acoustic fingerprinting model operable to convert each of the plurality of keystrokes to corresponding notes, each of said corresponding notes resulting from the measuring of the sound of each of the plurality of keystrokes;

a database for storing:
  the corresponding notes; and
  the keys associated with the corresponding notes;
a second request from a second user, said second request being input into the initial system, the second request comprising the password with a second plurality of keystrokes;
using the smart sensor to measure a second sound associated with each of the second plurality of keystrokes;
comparing, using the acoustic fingerprinting model, the corresponding notes to the second plurality of keystrokes; and
based upon the comparing, assigning a similarity score to the second user, said score over a predetermined percentage of similarity;
  wherein when the similarity score is greater than a predetermined percentage of similarity, the acoustic fingerprinting model is further operable to grant the second user access into the system; and
  wherein when the similarity score is less than the predetermined percentage of similarity, the acoustic fingerprinting model is further configured to deny the second user access into the system;
  wherein the acoustic fingerprinting device is further configured to:
    convert a second input and an associated sound, pressure and velocity, said second input of the password from a second user, to a second plurality of notes;
    compare the notes stored in the database to the second plurality of notes; and
    assign a similarity score to the second user based on the comparison;
    authenticate the second user when the similarity score is above the threshold level of similarity, and
    when said similarity score of the second user is below the threshold level of similarity, deny the second user access to the system.

11. The system of claim 10 wherein the database is configured to store each keystroke that the initial user types said each keystroke being distinct from the password.

12. The system of claim 10 wherein the acoustic fingerprinting model provides a multi-layer security, said multi-layer security involving a password, a verification of the password and a verification of a user inputting the password.

13. The system of claim 10 wherein the smart sensor is further configured to measure a pressure and a velocity of the user on the keys of a keyboard.

14. The system of claim 10 wherein the smart sensor is further configured to sense a user's fingerprint on the keys.

15. Apparatus for an acoustic fingerprinting device, the apparatus comprising:
  a computing system;
  a receiver operable to receive a request from an initial user, the request comprising an input of a plurality of keystrokes;
  a smart sensor, the smart sensor operable to:
    measure an aggregated sound associated with each keystroke included in the plurality of keystrokes; and
    convert the measured aggregated sound to a plurality of notes;
  a database, the database operable to store the plurality of notes;
  an authenticator operable to:
    receive a second request from the initial user, said second request comprising a second plurality of keystrokes;
    measure an aggregated sound associated with each keystroke included in the second plurality of keystrokes;
    compare the second plurality of keystrokes to the first plurality of keystrokes; and
    determine that the second plurality of keystrokes matches, over a threshold level of similarity, the first plurality of keystrokes; and
    authenticate the initial user;
    wherein, when said score is less than the pre-determined percentage of similarity, denying the second user access into the system and
    wherein the acoustic fingerprinting device is further configured to:
      convert a second input and an associated sound, pressure and velocity, said second input of the password from a second user, to a second plurality of notes;
      compare the notes stored in the database to the second plurality of notes; and
      assign a similarity score to the second user based on the comparison;
      authenticate the second user when the similarity score is above the threshold level of similarity, and
    when said similarity score of the second user is below the threshold level of similarity, deny the second user access to the system.

16. The apparatus of claim 15 wherein the smart sensor is further configured to measure a pressure and a velocity of the initial user as the initial user inputs a password.

17. The apparatus of claim 16 wherein the smart sensor is further configured to convert the measured pressure and velocity into notes.

18. The apparatus of claim 17 wherein the databases stores the notes with the associated keys.

* * * * *